L. RITZMAN.
FLUME GATE.
APPLICATION FILED NOV. 13, 1912.
1,065,839.
Patented June 24, 1913.
2 SHEETS—SHEET 1.
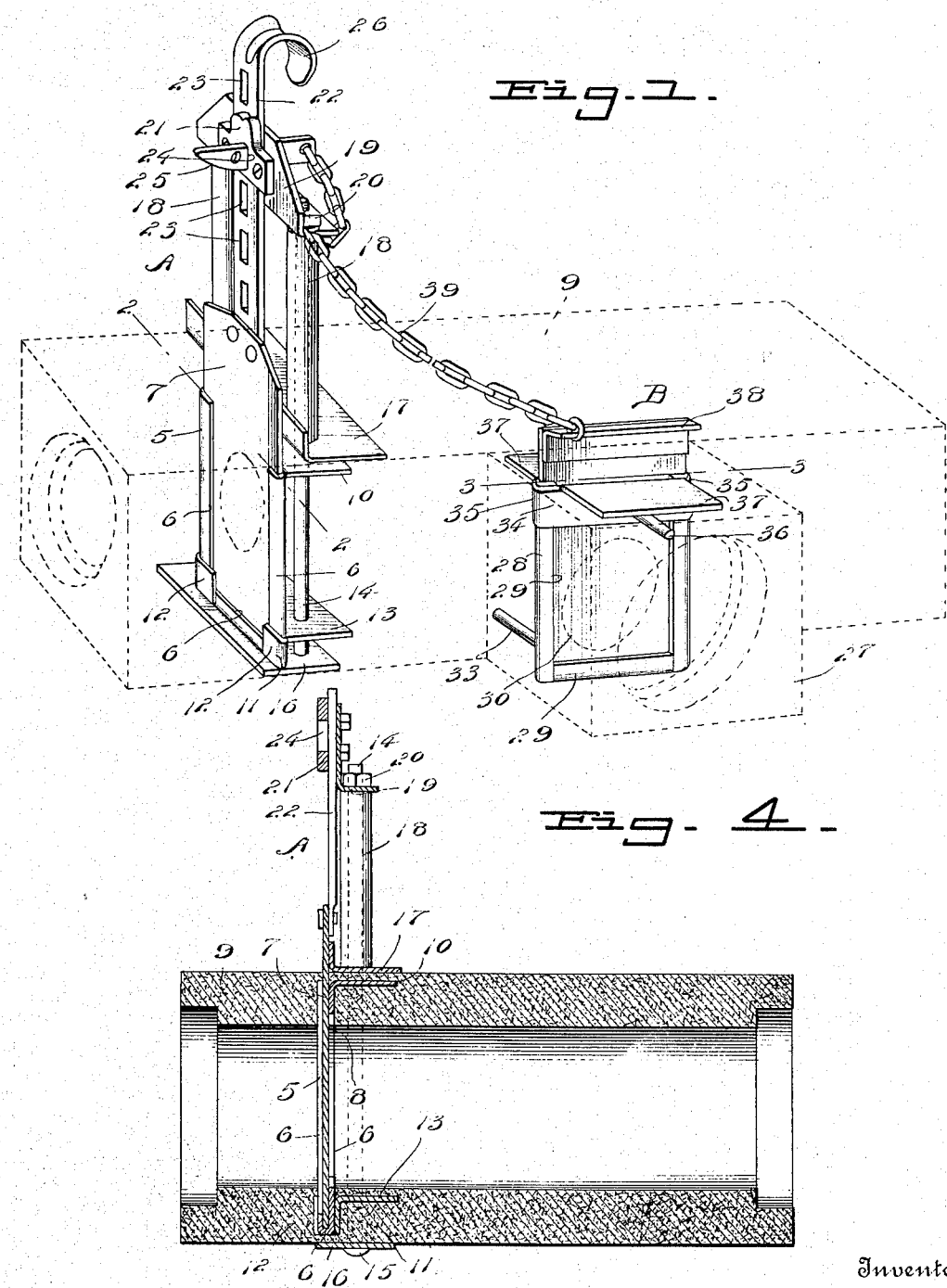
Inventor
Lorentz Ritzman.
Witnesses
By Victor J. Evans
Attorney L. RITZMAN.
FLUME GATE.
APPLICATION FILED NOV. 13, 1912.
1,065,839.
Patented June 24, 1913.
2 SHEETS—SHEET 2.
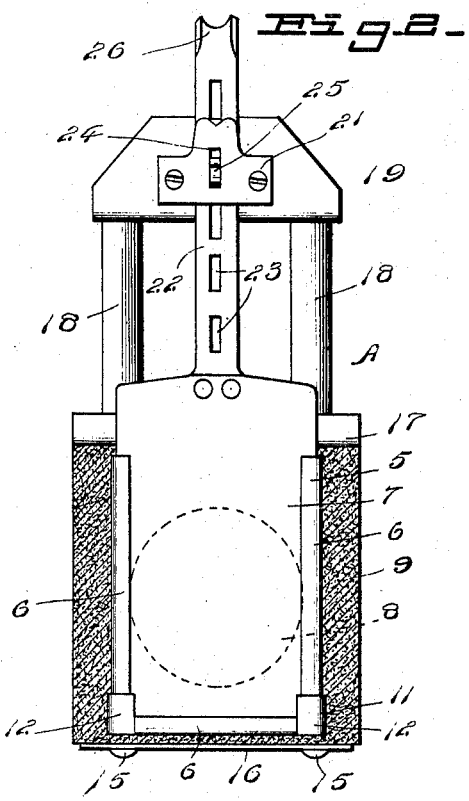
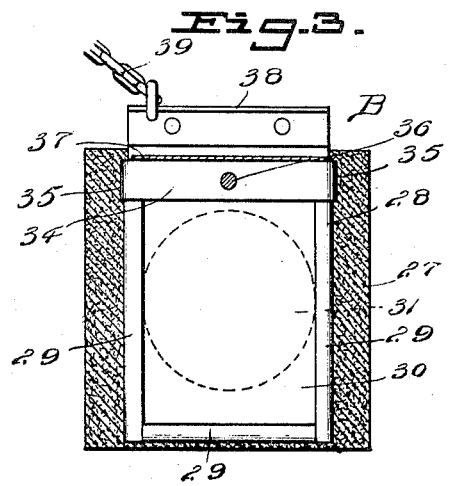
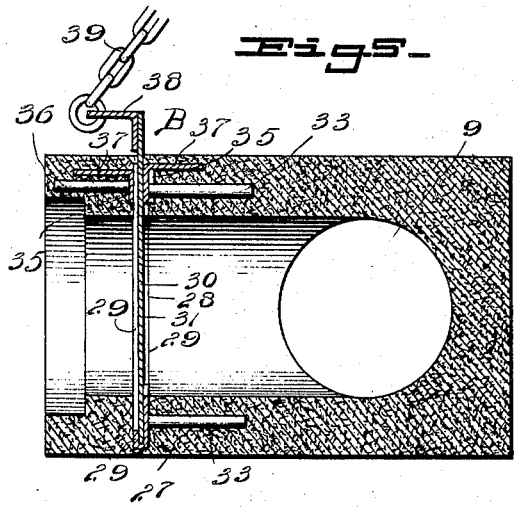
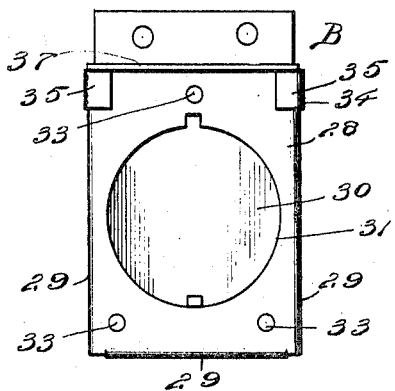
Inventor
Lorentz Ritzman
Witnesses
By Victor J. Evans
Attorney

UNITED STATES PATENT OFFICE.

LORENTZ RITZMAN, OF CANON CITY, COLORADO.

FLUME-GATE.

1,065,839.

Specification of Letters Patent. Patented June 24, 1913.

Application filed November 13, 1912. Serial No. 731,154.

*To all whom it may concern:*

Be it known that I, LORENTZ RITZMAN, a citizen of the United States, residing at Canon City, in the county of Fremont and State of Colorado, have invented new and useful Improvements in Flume-Gates, of which the following is a specification.

The invention relates to gates, and more particularly to the class of flume head gates.

The primary object of the invention is the provision of a head gate wherein the guide frame for the slide is concealed and securely mounted within the flume pipe or conduit ordinarily used in irrigation so that the gate proper or slide can be readily opened or closed without the possibility of leakage between it and the frame.

Another object of the invention is the provision of a gate which may be securely fastened within the main flume pipe or conduit or in the branches leading therefrom, the gate being designed for mounting at any point throughout the length of the conduit or branches, the frame supporting the gate being adapted to frictionally hold it in adjusted position for controlling the water supply through the conduit or branches.

A further object of the invention is the provision of a head gate which is simple in construction, thoroughly reliable and efficient in its operation, and inexpensive in manufacture.

With these and other objects in view the invention consists in the construction, combination and arrangement of parts as will be hereinafter more fully described, illustrated in the accompanying drawings, and pointed out in the claim hereunto appended.

In the drawings: Figure 1 is a fragmentary perspective view of a main conduit and one of its branches showing the gates mounted therein constructed in accordance with the invention, a portion of the conduit and branch being shown in dotted lines. Fig. 2 is a sectional view on the line 2—2 of Fig. 1. Fig. 3 is a sectional view on the line 3—3 of Fig. 1. Fig. 4 is a vertical longitudinal sectional view through the main flume or conduit. Fig. 5 is a vertical sectional view through the branch leading from the main flume or conduit. Fig. 6 is a plan view of the gate removed from the branch of the conduit.

Similar reference characters indicate corresponding parts throughout the several views in the drawing.

Referring to the drawings by numerals A and B designate respectively independent head gates, one being mounted in the main flume or conduit, while the other is mounted in the branch leading therefrom.

The gate A comprises a frame 5 formed from a single sheet of material preferably metal, which is bent at three of its edges to provide offset guide flanges 6, receiving a gate slide 7, the frame being formed with a circular shaped opening 8 which is adapted to be closed by the slide 7 when pushed inwardly over said opening. The flanges 6 frictionally engage the slide 7, so as to hold it in adjusted position, thereby regulating the supply of water running within a conduit pipe, main or flume ordinarily used for irrigating purposes, the same in this instance being preferably made from cement or other composite material. Bent from the remaining edge of the frame is an outturned flange 10, while bridging the said frame is a cross bar 11 which is provided with inturned or clamping ends 12 embracing the said frame 5 for the fastening of the bar thereon at one end. This bar 11 is provided with an outturned flange 13 and passed vertically through the flanges 10 and 13 are vertical bolt members 14, the frame 5 being embedded in the conduit pipe main or flume 9 and the bolt members extend upwardly through the top and bottom thereof.

The headed ends 15 of the bolt members 14 engage a bearing plate 16 disposed transversely against the bottom side of the pipe main or flume 9, while the upper ends of said bolt members are passed through an L-shaped plate 17 disposed transversely against the top side of the said pipe main or flume, and have surrounding the same spacer sleeves 18, on the upper ends of which rests a head plate 19, the bolt members 14 being passed through the latter and have threaded thereon ordinary nuts 20, thus securing said head plate thereto. Bolted or otherwise secured to the head plate 19 medially thereof is a keeper plate 21 between which and the said head plate 19 slides a pull handle or bar 22, the latter being provided with a series of elongated openings 23 adapted to register with a correspondingly shaped opening 24 formed in the keeper plate 21 for receiving a locking key 25, the pull handle or bar 22 being secured to the upper end of the gate slide 7. The free end of the handle or bar 22 is formed with a hook-like finger hold 26 whereby it may be raised and lowered in a convenient manner for the opening and closing of the said slides 7 in the frame 5 of the device.

It will be noted that the handle or bar 22 can be locked by the key 25 in different positions so as to regulate the extent of the opened or closed position of the gate slides 7 in the frame 5 so as to control the water supply through the pipe main or flume.

Leading from the pipe main or flume 9 at right angles thereto is a branch 27 in which is embedded the gate B which comprises a frame 28 formed from a single sheet of material preferably metal, which is bent at three of its edges to provide offset guide flanges 29 receiving a gate slide 30, the frame being formed with a circular opening 31, which is adapted to be closed by the slide 32 when pushed inwardly from said opening.

The flanges 29 frictionally engage the slide 30 so as to hold it in adjusted position thereby regulating the supply of water running through the branch 27.

Mounted in the frame 28 are outwardly extending bolt-like members 33, which latter are adapted to become anchored within the cementitious body of the branch 27 while bridging said frame on the side formed with the flanges 29 is a cross bar 34 which is provided with inturned clamping ends 35 embracing the said frame for the fastening of the bar thereon at one end of the same. Mounted in the bar 34 and extending outwardly therefrom is a bolt-like member 36, the same being also anchored within the body of the branch 27, the frame 28 and bar 34 respectively being formed with out-turned oppositely extending flanges 37, which are embedded in the body of the branch so as to prevent the possible displacement of the frame.

Fixed to the slide 32 at its upper edge is an L-shaped plate 38, which permits the connection therewith of a suitable flexible device such as a chain 39, whereby the slide may be moved to open position it being understood of course that the slide may be adjusted within the said frame for controlling the distribution of water through the branch from the conduit pipe, main or flume.

From the foregoing, taken in connection with the accompanying drawings, it is thought that the construction and operation of the invention will be clearly understood, and therefore, a more extended explanation has been omitted.

What is claimed is:—

A head gate comprising a frame having an open center, a gate slidably connected in the frame, means anchoring said frame in a conduit pipe, said means being projected exteriorly above the said pipe, a bridge plate connected with said means, a keeper plate carried by said bridge plate, a pull member connected to one end of said gate, and slidable between the bridge and keeper plates, and a key passed through said plates and adjustably engaging said member for regulating the gate.

In testimony whereof I affix my signature in presence of two witnesses.

LORENTZ RITZMAN.

Witnesses:
D. W. Ross,
John A. Laws.